United States Patent
Suzuki et al.

(10) Patent No.: US 6,625,534 B2
(45) Date of Patent: Sep. 23, 2003

(54) CONTROL APPARATUS AND CONTROL METHOD FOR A POWER TRAIN

(75) Inventors: Takashi Suzuki, Susono (JP);
Toshifumi Takaoka, Susono (JP);
Naoto Suzuki, Fujinomiya (JP);
Makoto Yamazaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/910,881

(22) Filed: Jul. 24, 2001

(65) Prior Publication Data

US 2002/0016660 A1 Feb. 7, 2002

(30) Foreign Application Priority Data

Aug. 3, 2000 (JP) ........................................ 2000-236222

(51) Int. Cl.[7] ................................................ B60L 11/14
(52) U.S. Cl. ............................. 701/62; 701/22; 701/53; 701/54; 180/65.1; 180/65.2
(58) Field of Search ............................... 701/62, 22, 53, 701/54; 180/65.2, 65.3, 65.4, 65.5, 65.6, 65.7, 65.8

(56) References Cited

U.S. PATENT DOCUMENTS

| | | | | |
|---|---|---|---|---|
| 5,697,466 A | * | 12/1997 | Moroto et al. | 180/65.2 |
| 5,873,426 A | * | 2/1999 | Tabata et al. | 180/65.7 |
| 5,935,040 A | * | 8/1999 | Tabata et al. | 180/65.2 |
| 5,960,897 A | * | 10/1999 | Furuya et al. | 180/243 |
| 6,405,818 B1 | * | 6/2002 | Anthony et al. | 180/65.2 |

FOREIGN PATENT DOCUMENTS

| | | |
|---|---|---|
| JP | A 5-168102 | 7/1993 |
| JP | A 10-196427 | 7/1998 |

* cited by examiner

Primary Examiner—William A Cuchlinski, Jr.
Assistant Examiner—Eric M Gibson
(74) Attorney, Agent, or Firm—Oliff & Berridge, PLC

(57) ABSTRACT

A control apparatus for a power train that includes an engine and a motor generator that generates power to a wheel. Furthermore, a clutch is disposed in a power transmission path from the engine to the wheel includes a driving power controller for controlling power generated from the motor generator to the wheel when the clutch fails.

20 Claims, 9 Drawing Sheets

CONTROL APPARATUS AND CONTROL METHOD FOR A POWER TRAIN

INCORPORATION BY REFERENCE

The disclosure of Japanese Patent Application No. 2000-236222 filed on Aug. 3, 2000 including the specification, drawings and abstract is incorporated herein by reference in its entirety.

BACKGROUND OF THE INVENTION

1. Field of Invention

The invention relates to a control apparatus and a control method for a power train including a plurality of driving power sources for transmitting power to a wheel.

2. Description of Related Art

Conventionally, a hybrid vehicle that are provided with different types of driving power sources, e.g., an engine and an electric motor is known. In this hybrid vehicle, by controlling driving/stopping of the engine and electric motor based on a running state of the vehicle, reduction in exhaust emissions, improvement in fuel economy, noise reduction and the like can be accomplished. Japanese Laid-Open Patent Publication No. 10-196427 describes an example of a driving controller of a hybrid vehicle provided with an engine and an electric motor on-board.

The hybrid vehicle described in the aforementioned publication has an engine and a motor generator as driving power sources. A first clutch is provided in a power transmission path from the engine to a transmission, and a second clutch is provided in a power transmission path from the motor generator to the transmission. A battery is connected to the motor generator through an inverter. When both the engine and motor generator operate normally, engagement/disengagement of the first and second clutches are controlled based on a predetermined normal control mode, and the vehicle runs with the power of at least either the engine or motor generator.

If at least either the engine or motor generator fails, a failure control mode different from the normal control mode is selected. More specifically, whether or not the engine is operating normally is determined based on the fuel injection amount, throttle valve opening, engine speed and the like, and the control mode is switched between the normal and failure control modes accordingly. For example, if it is determined that the engine is not operating normally, and the failure control mode is selected, the first clutch is disengaged so that the power transmission path from the engine to the transmission is cut off, while the second clutch is engaged so that the vehicle runs with the motor generator as a driving power source. This control is recognized to provide suppression of fluctuation in driving torque resulting from the failure in the engine.

The aforementioned publication describes the control in response to a failure of the driving power sources, i.e., at least either the engine or motor generator, but does not recognize the control in response to a failure in a power transmission apparatus, e.g., clutch, transmission, provided in a power transmission path from the driving power source to a wheel. Therefore, when such failure occurs, running performance of the vehicle is degraded.

SUMMARY OF THE INVENTION

It is an object of the invention to provide a control apparatus and a control method of a power train, which are capable of corresponding to a failure in a power transmission apparatus provided in a power transmission path from one of driving power sources to a wheel.

In a first aspect of the invention, a control apparatus of a power train includes a first driving power source and a second driving power source for transmitting power to a wheel, and a power transmission apparatus for transmitting the power of the first driving power source to the wheel. The control apparatus further includes a driving power controller for controlling the power transmitted to the wheel by the second driving power source when the power transmission apparatus fails.

According to the aforementioned aspect, the power transmitted to the wheel is controlled through the second driving power source when the power of the first driving power source can no longer be transmitted to the wheel, for example, due to a failure in which the power transmission apparatus cannot transmit power.

In addition to the aforementioned aspect, the driving power controller may function to transmit the power of the second driving power source to the wheel, and to prevent a load on the second driving power source during operations other than the transmission of power to the wheel.

Thus, the load on the second driving power source is reduced, whereby reduction in the power transmitted to the wheel as well as reduction in the energy required to drive the second driving power source can be prevented.

Moreover, in the aforementioned aspect, the power of the first driving power source may be transmitted to the wheel via a transmission and an output side of the transmission may be coupled to the second driving power source. In this aspect, the driving power controller may function to reduce the load on the second driving power source by controlling the transmission to function in a neutral state.

Thus, the load of the second driving power source can be reduced by controlling the transmission, thereby eliminating the need for a special separate mechanism for reducing the load on the second driving power source.

In addition to the aforementioned aspect, the power of the second driving power source may be transmitted to the wheel via a transmission, and the driving power controller may function to operate different gearshift controls in the transmission when the power transmission apparatus fails as compared to when the power transmission apparatus operates normally.

Thus, gearshift control in the transmission can operate differently when the power transmission apparatus fails as compared to when the power transmission apparatus operates normally. Accordingly, when the power transmitted to the wheel is controlled through the power of the second driving power source due to a failure in the power transmission apparatus, the torque output from the transmission is controlled similarly to when failure in the power transmission apparatus occurs.

In the aforementioned aspect, the driving power controller may function to set a gear ratio, when the power transmission apparatus fails, that is higher than a gear ratio used when the power transmission apparatus operates normally.

Thus, the gear ratio is likely to be set, when the power transmission apparatus fails, to a higher rate than that is set when the power transmission apparatus operates normally. Accordingly, when the power transmission apparatus fails, the driving power of the vehicle is higher as compared to when the power transmission apparatus operates normally.

In the aforementioned aspect, the driving power controller may function to improve an efficiency of the second driving power source when the power transmission apparatus operates normally and controls the gear ratio of the transmission to be higher than the efficiency of the second driving power source when the power transmission apparatus fails.

Thus, the efficiency of the second driving power source is improved through the higher gear ratio that is set when the power transmission apparatus fails as compared to when the power transmission apparatus operates normally. As a result, power consumption in driving the second driving power source is reduced.

In addition to the aforementioned aspect, the second driving power source may be driven with electric power, the power provided with a generator driven by the first driving power source, supplying generated electric power to the second driving power source, and the driving power controller may function to control electric power by the generator through the power of the first driving power source when the power transmission apparatus fails.

Thus, for example, when a failure occurs in the transmission apparatus, the electric power generated through the power of the first driving power source is supplied to the second driving power source. As a result, reduction in the electric power supplied to the second driving power source is prevented.

In the aforementioned aspect, the driving power controller may function to control the generator through the power of the first driving power source to generate electric power, when the power supplied to the second driving power source is reduced to below a prescribed value.

Thus, when the power supplied to the second driving power source is reduced to below the prescribed value, the generator generates electric power through the power of the first driving power source. As a result, there is a further reduction in electric power supplied to the second driving power source.

In addition to the aforementioned aspect, the power of the first driving power source may be transmitted to the wheel via a transmission, and the driving power controller may function to synchronize an input revolution speed of the transmission with an input revolution speed after gearshift when the power transmission apparatus fails, and thus the power transmitted to the wheel is controlled through the second driving power source.

Accordingly, when the power transmission apparatus fails, the input revolution speed of the transmission can be forcibly synchronized with the input revolution speed after gearshift.

In addition to the aforementioned first aspect, an autonomous revolution controller for controlling an autonomous revolution of the first driving power source may be further included. The driving power controller function to transmit the power of the second driving power source to the wheel, cause initial revolution of the first driving power source with the power of the second driving power source and to shift revolution of the first driving power source from the initial revolution to an autonomous revolution by the autonomous revolution controller.

Accordingly, provided that the vehicle is stopped and the power of the first driving power source is continuously transmitted due to a failure in the power transmission apparatus, the power of the second driving power source is first transmitted to the wheel, and the first driving power source is revolved by the second driving power source up to a revolution speed that allows an autonomous revolution. Thereafter, the first driving power source is revolved autonomously. As a result, the first driving power source can be started even when the power transmission apparatus is engaged.

In the present invention, different types of driving power sources can be used as the first and second driving power sources. More specifically, driving power sources generating power based on different principles can be used as the first and second driving power sources. A clutch capable of switching between various power transmission states, i.e., an engaged, disengaged and slipped state, and a transmission for controlling the ratio between the respective revolution speeds of input and output members can be used as the power transmission apparatus. A transmission capable of varying the gear ratio in a step-by-step manner, i.e., discontinuously, or a transmission capable of varying the gear ratio in a stepless manner, i.e., continuously, can be used as the transmission. A frictional clutch hydraulic clutch, or electromagnetic clutch may be used as the clutch.

Examples of transmission failures can include the following cases: the current gear ratio cannot be changed to another gear ratio; the gear ratio is set to a gear ratio different from the intended ratio; the transmission cannot be switched between a state in which the power transmission is not available, i.e., neutral state, and a state in which the power transmission is available; and/or the torque transmission capacity is controlled to an amount different from the desired amount.

Examples of the clutch failures can include the following cases: the torque transmission capacity cannot be changed; the torque transmission capacity is set to an amount different from the intended amount; the clutch cannot be switched from one of the engaged, disengaged and slipped states to another state; the clutch is controlled to a state different from the requested state, i.e., engaged, disengaged or slipped state.

In the invention, different gearshift control of the transmission can mean that the gear ratio to be set is different even if the running state of the vehicle, e.g., reference parameters for determining gearshift such as vehicle speed and accelerator opening, is the same.

In another aspect of the invention, a method for controlling a power train that includes first and second driving power sources for transmitting power to a wheel, and a power transmission apparatus for transmitting the power of the first driving power source to the wheel, includes a step of controlling through the second driving power source the power transmitted to the wheel when the power transmission apparatus fails.

DETAILED DESCRIPTION OF PREFERRED EMBODIMENTS

Figure 2:
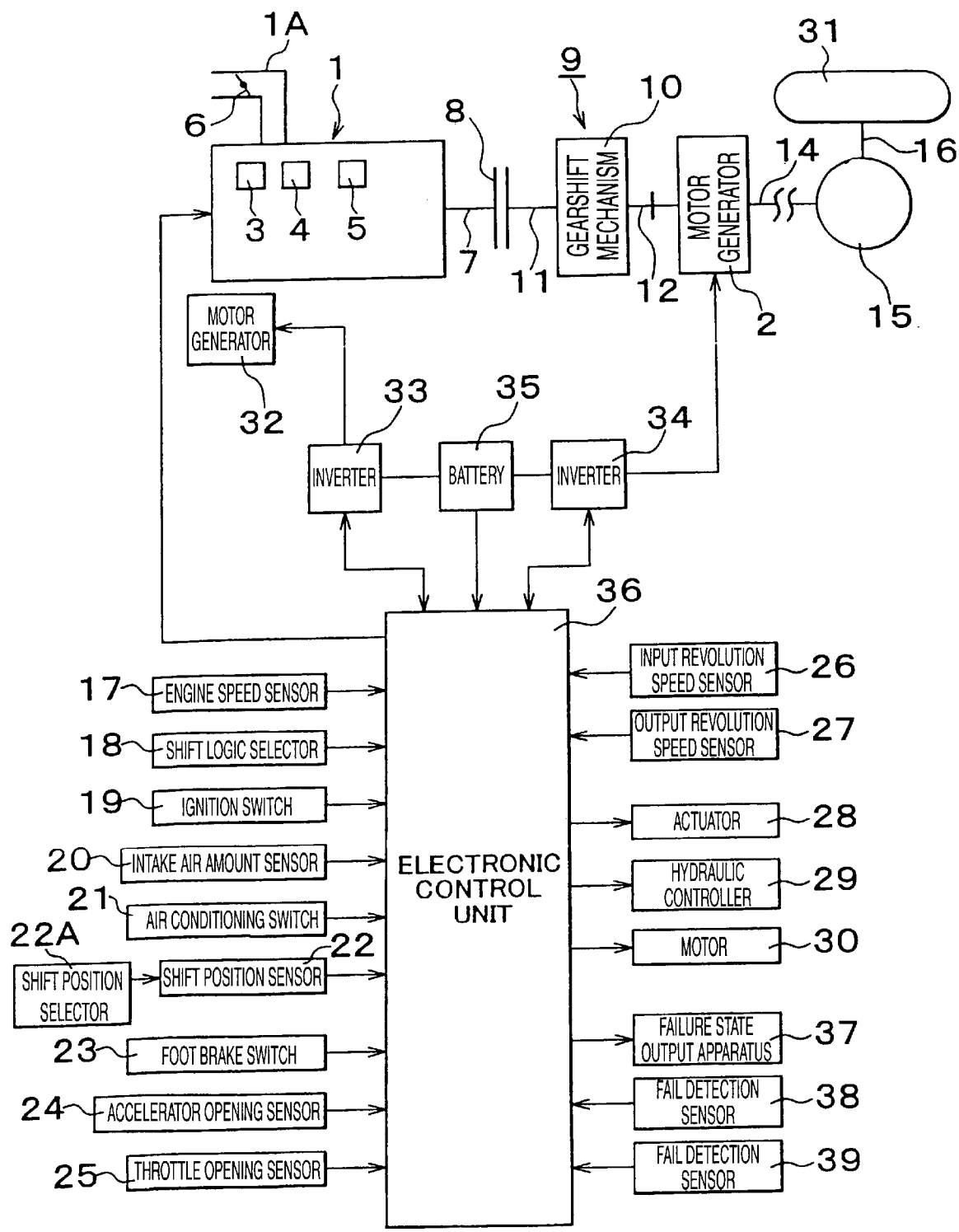
FIG. 2 is a diagram showing a power train and a control system in a hybrid vehicle.

Hereinafter, specific examples of the invention will be described in conjunction with the accompanying drawings. FIG. 2 is a conceptual diagram showing a vehicle structure, i.e., a power train, of a first embodiment to which a control process of the invention can be applied. More specifically, an engine 1 and a motor generator (MG) 2 are provided as driving power sources of the vehicle. The engine 1 is an apparatus for outputting power, i.e., torque, generated by fuel combustion. An internal combustion engine, e.g., gasoline engine, diesel engine or LPG (liquefied petroleum gas) engine, can be employed as the engine 1. For convenience, it is assumed in the present embodiment that a gasoline engine is used as the engine 1. The engine 1 has a known structure including an igniter 3, a fuel injection system 4, a cooling system 5, an electronic throttle valve 6, and the like. The electronic throttle valve 6 is provided within an intake pipe 1A of the engine 1.

A transmission 9 is coupled to one end of a crankshaft 7, i.e., an output member of the engine 1, through a clutch 8. A frictional clutch, hydraulic clutch, electromagnetic clutch or the like may be used as the clutch 8. When a hydraulic clutch is used as the clutch 8, the hydraulic clutch can comprise a torque converter having a function to amplify the torque transmitted from an input-side member to an output-side member, and a lock-up clutch that is engaged, disengaged or slipped in order to switch the power transmission state between the input-side member and output-side member. In the torque converter, hydraulic power transmission is conducted. However, the power transmission is switched to mechanical power transmission by engaging the lock-up clutch. Accordingly, when a hydraulic clutch is used as the clutch 8, engaging/disengaging of the clutch 8 means engaging/disengaging of the lock-up clutch. The torque transmission capacity is controlled by controlling the engaging pressure of the clutch 8.

Examples of the transmission 9 can include a transmission capable of automatically controlling the gear ratio based on the running state of the vehicle, i.e., a so-called automatic transmission, and a transmission capable of manually switching the gear ratio by the driver's operation, i.e., a so-called manual transmission. For convenience, it is herein assumed that an automatic transmission is used as the transmission 9. The transmission 9 includes a gearshift mechanism 10, an input member 11 coupled to the input side of the gearshift mechanism 10, and an output member 12 coupled to the output side of the gearshift mechanism 10. Further, a hydraulic controller 29 for controlling the gearshift transmission 10 is provided. The hydraulic controller 29 includes a known solenoid valve and the like. A continuously variable transmission capable of varying the gear ratio in a stepless manner, i.e., continuously, or a step transmission capable of varying the gear ratio in a step-by-step manner, i.e., discontinuously, can be used as the transmission 9.

When a step transmission is used as the transmission 9, the gearshift mechanism 10 can comprise a known planetary gear mechanism, a known frictional engaging apparatus (neither shown) and the like. In the step transmission, the hydraulic controller 29 controls engaging/disengaging of the frictional engaging apparatus in order to control the gear ratio (gear).

In contrast, when a continuously variable transmission is used as the transmission 9, a known belt-type continuously variable transmission or a known toroidal-type continuously variable transmission can be used. When a belt-type continuously variable transmission is used as the transmission 9, the gearshift mechanism 10 can comprise a driving pulley coupled to the input member 11, a driven pulley coupled to the output member 12, and a belt wound in grooves of the driving and driven pulleys respectively. The pulleys and belt are not shown in the figures. The groove width of the driving pulley and the groove width of the driven pulley can be controlled with the hydraulic controller 29. The gear ratio of the belt-type continuously variable transmission is controlled by controlling the radius of the belt wound onto the driving pulley. The tension of the belt, i.e., torque transmission capacity, can be controlled by controlling the groove width of the driven pulley.

When a toroidal-type continuously variable transmission is used as the transmission 9, the gearshift mechanism 10 can comprise a driving disk coupled to the input member 11, a driven disk coupled to the output member 12, and a power roller contacting the toroidal surface of the driving disk and the toroidal surface of the driven disk. The disks and roller are not shown in the figures. The gear ratio of the toroidal-type continuously variable transmission is controlled by controlling the contact radius between the driving and driven disks and the power roller. In the toroidal-type continuously variable transmission, the driving and driven disks and the power roller are separated by oil, respectively, and power transmission occurs between each disk and the power roller by the oil forming a glassy substance. Thus, the toroidal-type continuously variable transmission transmits power by so-called traction transmission.

When a continuously variable transmission is used as the transmission 9, a forward/reverse movement switching mechanism (not shown) is disposed midway of the input member 11. This forward/reverse movement switching mechanism comprises a clutch, brake, planetary gear mechanism and the like. Switching the respective states of the clutch and brake between engaged and disengaged states changes the rotation direction of the input member 11 of the transmission 9 with respect to the rotation direction of the crankshaft 7, whereby the traveling direction of the vehicle is switched between forward and reverse directions.

The motor generator 2 is provided to function both as an electric motor for receiving electric energy, i.e., electric power, and outputting power, i.e., torque, and as a generator for converting mechanical energy into electric power. For example, a permanent magnet synchronous motor can be used as the motor generator 2. Thus, the engine 1 and the motor generator 2 generate the power according to different principles. A rotor (not shown) of the motor generator 2 is coupled to a power transmission shaft 14, and one end of the power transmission shaft 14 is coupled to the output member 12 of the transmission 9. The other end of the power transmission shaft 14 is coupled to a differential 15, and a wheel 31 are coupled to the differential 15 through a drive shaft 16. Thus, the motor generator 2 is disposed in the power transmission path between the transmission 9 and the differential 15.

A motor generator 32 is coupled to the crankshaft 7. The motor generator 32 is provided with both of a function as an electric motor for receiving electric power and outputting power, and a function as a generator driven by the engine 1 to generate electric power. For example, a permanent magnet synchronous motor can be used as the motor generator 32. The motor generator 32 is primarily used to start the engine 1. A power transmission mechanism, e.g., chain or belt, is disposed in the power transmission path between the motor generator 32 and the crankshaft 7.

A battery 35 is connected to the motor generators 2 and 32 through inverters 33 and 34, respectively. An electronic control unit (ECU) 36 is connected to the inverters 33, 34 and the battery 35. The ECU 36 comprises a microcomputer including as its main components a central processing unit, i.e., CPU or Micro Processing Unit (MPU), storage device (Random Access Memory (RAM) and Read Only Memory (ROM)) and an input/output (I/O) interface.

The ECU 36 can receive signals from various components, including: a signal of an engine speed sensor 17; a signal of a shift logic selector 18; a signal of an ignition switch 19; a signal of an intake air amount sensor 20; a signal indicating a state of charge (SOC) of the battery 35; a signal of an air-conditioning switch 21; a signal of a shift position sensor 22; a signal of a foot brake switch 23; a signal of an accelerator opening sensor 24; a signal of a throttle opening sensor 25; a signal of an input revolution speed sensor 26 for the transmission 9; a signal of a fail detection sensor 38 for detecting a failure in an actuator 28 for controlling engaging/disengaging of the clutch 8; a signal of a fail detection sensor 39 for detecting a failure in the solenoid value of the hydraulic controller 29 and the like; and a signal of an output revolution speed sensor 27 for the transmission 9. The vehicle speed is calculated based on the signal of the output revolution speed sensor 27. The driver operates the shift logic selector 18 to change the control details for controlling the gear ratio of the transmission 9. Examples of the shift logic selector 18 can include known operating apparatuses such as a touch switch, lever operable within a prescribed angle around the fulcrum, and rotatable knob.

The shift position sensor 22 detects the state of a shift position selector 22A operated by the driver. When a step transmission is used as the transmission 9, shift positions such as P (parking), R (reverse), N (neutral), D (drive), third, second and L (low) positions can be selectively switched by operating the shift position selector 22A. The P and N positions are non-driving positions. Therefore, when the P or N position is selected, the frictional engaging apparatus of the gearshift mechanism 10 is controlled so that the power transmission path between the input member 11 and output member 12 of the transmission 9 can no longer transmit the torque therethrough.

In contrast, the shift positions such as R, D, third, second and L positions are driving positions. Therefore, when any one of the R, D, third, second and L positions is selected, the frictional engaging apparatus of the gearshift mechanism 10 is controlled so that the power transmission path between the input member 11 and output member 12 of the transmission 9 can transmit the torque therethrough, and a prescribed gear is thus set. In a driving position, forward and reverse gears can be selectively switched by switching engaging/disengaging of the frictional engaging apparatus, and for example, four forward gears and a reverse gear can be set.

More specifically, when the R position is selected, the gear of the transmission 9 is fixed to a prescribed gear. When the D position is selected, any gear can be selected freely in the range from the first to fourth gears. When the third position is selected, the gear can be selected freely in the range from the first to third gears. When the second position is selected, the gear can be selected freely between the first and second gears. When the L position is selected, the first gear is fixed.

The ECU 36 outputs signals which can include: a signal for controlling the igniter 3; a signal for controlling the fuel injection apparatus 4; a signal to an actuator, e.g., motor 30, for controlling opening of the electronic throttle valve 6; a signal for controlling the motor generators 2 and 32 through the inverters 33 and 34 respectively; a signal to the actuator 28 for controlling engaging/disengaging of the clutch 8; and a signal to the hydraulic controller 29; and a signal to a failure state output apparatus 37 for notifying the driver whether or not there is a failure in the power transmission apparatus and specific conditions of the failure. The failure state output apparatus 37 acoustically or visually notifies the driver a failure in the power transmission apparatus via a system such as speaker, buzzer, chime, lamp and display.

The correspondence between the structures of the present embodiment and the invention can be as follows: the engine 1 can correspond to a first driving power source of the invention; the motor generator 2 can correspond to a second driving power source of the invention; the clutch 8 and transmission 9 can correspond to a power transmission apparatus of the invention; the motor generator 32 can correspond to a generator of the invention; and the igniter 3, fuel injection apparatus 4 and electronic throttle valve 6 can correspond to an autonomous revolution controller of the invention.

In the hybrid vehicle of FIG. 2, the entire vehicle is controlled based on input signals to the ECU 36 and data pre-stored in the ECU 36. For example, the ignition switch 19 can detect the operation positions: LOCK (OFF), ACCESSORY, ON, and START. When the ignition switch 19 sequentially detects the ON and START positions, an engine start request is generated.

In response to the engine start request, the motor generator 32 is driven and the power of the motor generator 12 causes initial revolution of the engine 1, and the engine speed reaches above a prescribed speed. Moreover, fuel injection control, ignition control and intake air amount control are conducted, so that the engine 1 revolves autonomously. Driving of accessories such as a compressor for air-conditioning (not shown) is not required. When the battery 35 has a SOC of above a prescribed value, the engine 1 is automatically stopped after a prescribed time from starting of the engine 1.

During running of the vehicle, a required driving power is determined based on the vehicle speed and accelerator opening, and an engine output corresponding to the required driving power is calculated. Based on the calculated engine output, the engine speed is obtained from an optimal fuel economy line (not shown). Then, the gear ratio of the transmission 9 is controlled in order to control the engine speed. At least any one of the intake air amount, ignition timing and fuel injection amount is controlled in order to control the engine output. Provided that the clutch 8 of the power train of FIG. 2 is engaged, the engine torque is transmitted to the power transmission shaft 14 via the transmission 9, and the torque of the power transmission shaft 14 is transmitted to the wheel 31 through the differential 15. In a low load region in which the engine efficiency is poor, the engine 1 is stopped, and the torque of the motor generator 2 is transmitted to the wheel 31.

In order to conduct the aforementioned control, a driving power source control map is stored. In the control map, an engine driving region and a motor generator driving region are set using the accelerator opening and vehicle speed as parameters. Basically, the engine 1 is independently driven in the engine driving region, whereas the motor generator 2 is independently driven in the motor generator driving region. When the engine torque is not enough with respect to the required driving power in the engine driving region, the torque is compensated for by driving the motor generator 2 as an electric motor. More specifically, the torque to be allocated to the engine 1 and the torque to be allocated to the motor generator 2 are calculated based on the required driving power, and the engine 1 and motor generator 2 are controlled based on the calculation result.

In order to control the gear ratio of the transmission 9, a first control pattern selected in the engine driving region, and a second control pattern selected in the motor generator driving region are stored in the ECU 36. These control patterns, i.e., a gearshift map, are stored in order to control the gear ratio of the transmission 9 using the vehicle speed, accelerator opening and the like as parameters. In the case where the aforementioned step transmission is used as the transmission 9, an upshift line for upshifting the transmission 9 and a downshift line for downshifting the transmission 9 are set in the gearshift map. Moreover, when a torque converter with a lock-up clutch is used as the clutch 8, a lock-up clutch control map is stored in the ECU 36 in order to control engaging/disengaging of the lock-up clutch.

If the battery 35 does not have an insufficient SOC during running with the power of the engine 1, the engine output is increased and the motor generator 2 is operated as a generator, so that the battery 35 can be charged with the electric power. During deceleration, i.e., coasting, of the vehicle, the power of the wheel 31 is transmitted to the motor generator 2 and the motor generator 2 is operated as a generator, so that the battery 35 can be charged with the electric power, and a regenerative braking force can be thus generated. In each of the above controls, the clutch 8 can be engaged in order to transmit the engine torque to the wheel 31, and the clutch 8 can be disengaged in order to independently drive the motor generator 2 and transmit its torque to the wheel 31.

During the regenerative braking with the motor generator 2, the clutch 8 is disengaged so that the power generating efficiency of the motor generator 2 can be improved. In the present embodiment, engagement of the clutch 8 also enables initial revolution of the engine 1 with the power of the motor generator 2.

Here, a control example conducted in response to a failure, i.e., abnormality, in the power transmission apparatus will be described in connection with the flowchart of FIG. 1. First, whether or not the clutch 8 has failed is determined based on the signal of the fail detection sensor 38 (step S1). For example, it is determined whether or not the clutch 8 is disengaged or slipped when a request to engage the clutch 8 is generated. If NO in step S1, the routine returns to start.

If YES in step S1, so-called a MG running control is conducted (step S2), and then the routine returns to start. The MG running control can mean that the motor generator 2 is driven so that the vehicle runs with the power of the motor generator 2 transmitted to the wheel 31. Thus, if a clutch-off failure occurs in the clutch 8, the driving force for the vehicle is ensured with the motor generator 2, making the vehicle possible to run to be cleared as well as improvement in drivability.

In step S2, neutral control may also be conducted in addition to the MG running control. The neutral control can mean that the gearshift mechanism 10 is controlled to such a state that the power can no longer be transmitted between the input member 11 and the output members 12, i.e., a neutral state. When a step transmission is used as the transmission 9, for example, disengaging the frictional engaging apparatus can correspond to the neutral control. When a belt-type continuously variable transmission is used as the transmission 9, for example, reducing the tension of the belt to below a prescribed value can correspond to the neutral control.

The neutral control reduces the number of rotating elements on the side of the transmission 9, which are rotated by the power transmission shaft 14 during the MG running. Accordingly, the load of the motor generator 2 is reduced due to the reduced friction on the side of the transmission 9. Thus, wasting of the electric power supplied to the motor generator 2 can be prevented, whereby the running distance of the vehicle to be cleared can be increased.

Further in step S2, power generation control may also be conducted in addition to the MG running control. The power generation control means that the motor generator 32 is driven as a generator with the power of the engine 1 so as to charge the battery 35 with the power of the motor generator 32. More specifically, when a clutch-off failure occurs in the clutch 8, the power of the engine 1 cannot be transmitted directly to the wheel 31. However, the power generation control converts the power of the engine 1 to electric energy for supply to the motor generator 2 via the battery 35. As a result, the electric energy thus supplied can be output as power from the motor generator 2. Accordingly, reduction in the SOC of the battery 35 can be prevented, and the running distance of the vehicle to be cleared is further increased. In step S2, both of the power generation control and the neutral control may be conducted in addition to the MG running control.

Figure 3:
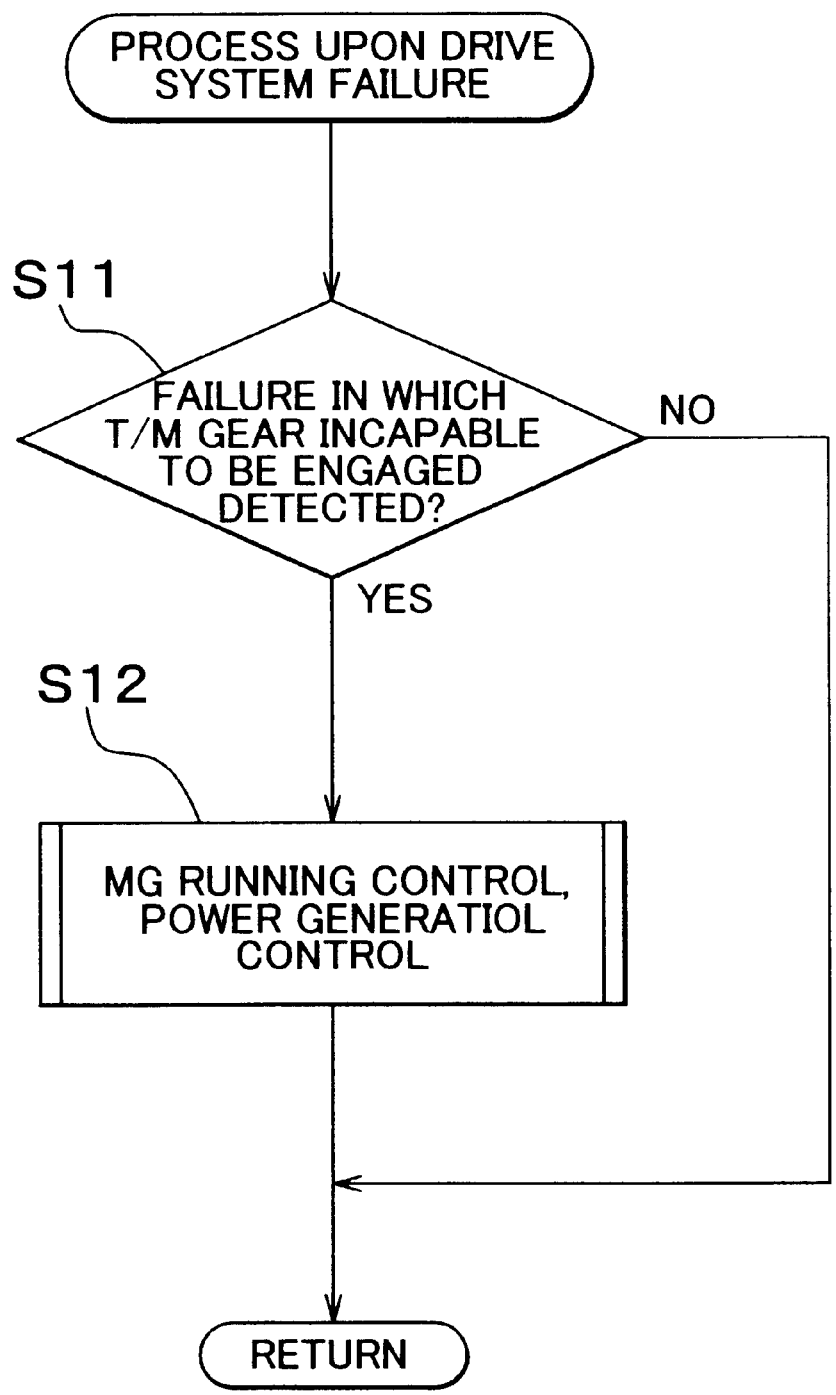
FIG. 3 is a flowchart illustrating a second embodiment of a control process according to the invention.

Another control example that is applicable to the power train of FIG. 2 will now be described in connection with FIG. 3. In the flowchart of FIG. 3, it is first determined whether or not a failure in which a prescribed gear ratio is incapable to be set in the transmission 9 has occurred (step S11). The failure in which a prescribed gear ratio is incapable to be set in the transmission 9 means that the gearshift mechanism 10 is rendered in the neutral state regardless of a request to make the gearshift mechanism 10 ready for power transmission.

When a step transmission is used as the transmission 9, the gearshift mechanism 10 is rendered in the neutral state in response to, e.g., a failure in which the frictional engaging apparatus is disengaged all the time. When a belt-type continuously variable transmission is used as the transmission 9, the gearshift mechanism 10 is rendered neutral in response to, e.g., a failure in which tension that is higher than a prescribed one is incapable to be applied to the belt, or when the belt is cut. When a toroidal-type continuously variable transmission is used as the transmission 9, the gearshift mechanism 10 is rendered in the neutral state in response to, e.g., a failure in which the power roller is incapable to be contacted with both disks. The determination at step S11 is made based on, e.g., whether or not there is a failure in the solenoid valve of the hydraulic controller 29.

If NO in step S11, the routine returns to start. If YES in step S11, the power of the engine 1 cannot be transmitted to the wheel 31. Therefore, if YES in step S11, the aforementioned MG running control is conducted (step S12), and then the routine returns to start. In step S12, the aforementioned power generation control may also be conducted in addition to the MG running control. More specifically, a failure where the clutch 8 is disengaged and a failure in where the transmission 9 is rendered in the neutral state regardless of a request to make the transmission 9 ready for power transmission are comparable since the engine torque cannot be transmitted to the wheel 31. Therefore, the same control can be conducted in step S12 of FIG. 3 and step S1 of FIG. 1 to countermeasure the respective failures. The effect resulting from conducting at least the MG running control and the power generation control in step S12 of FIG. 3 is the same as that resulting from conducting at least the MG running control and the power generation control in step S2 of FIG. 1.

Figure 1:
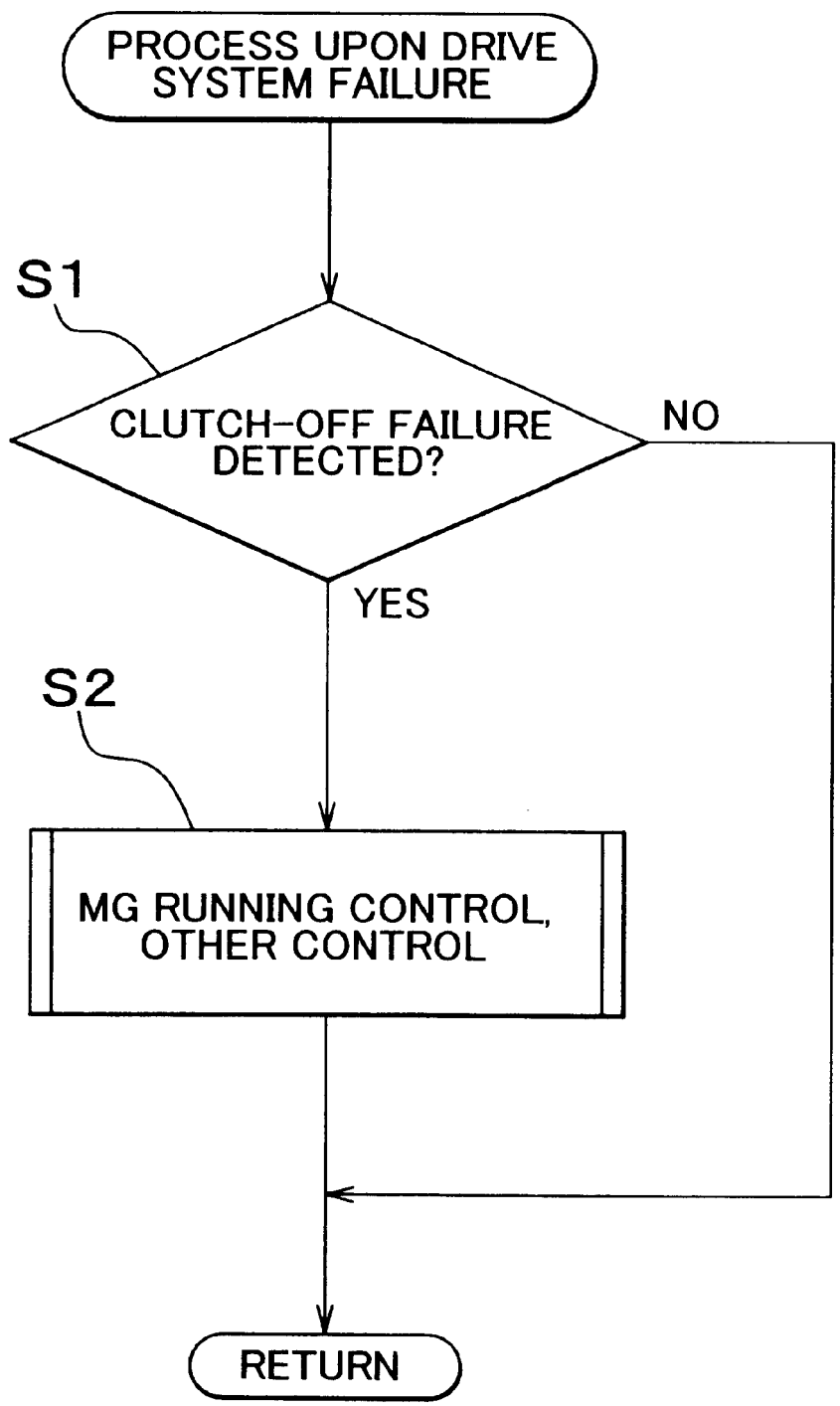
FIG. 1 is a flowchart illustrating an embodiment of a control process according to the invention.
Figure 4:
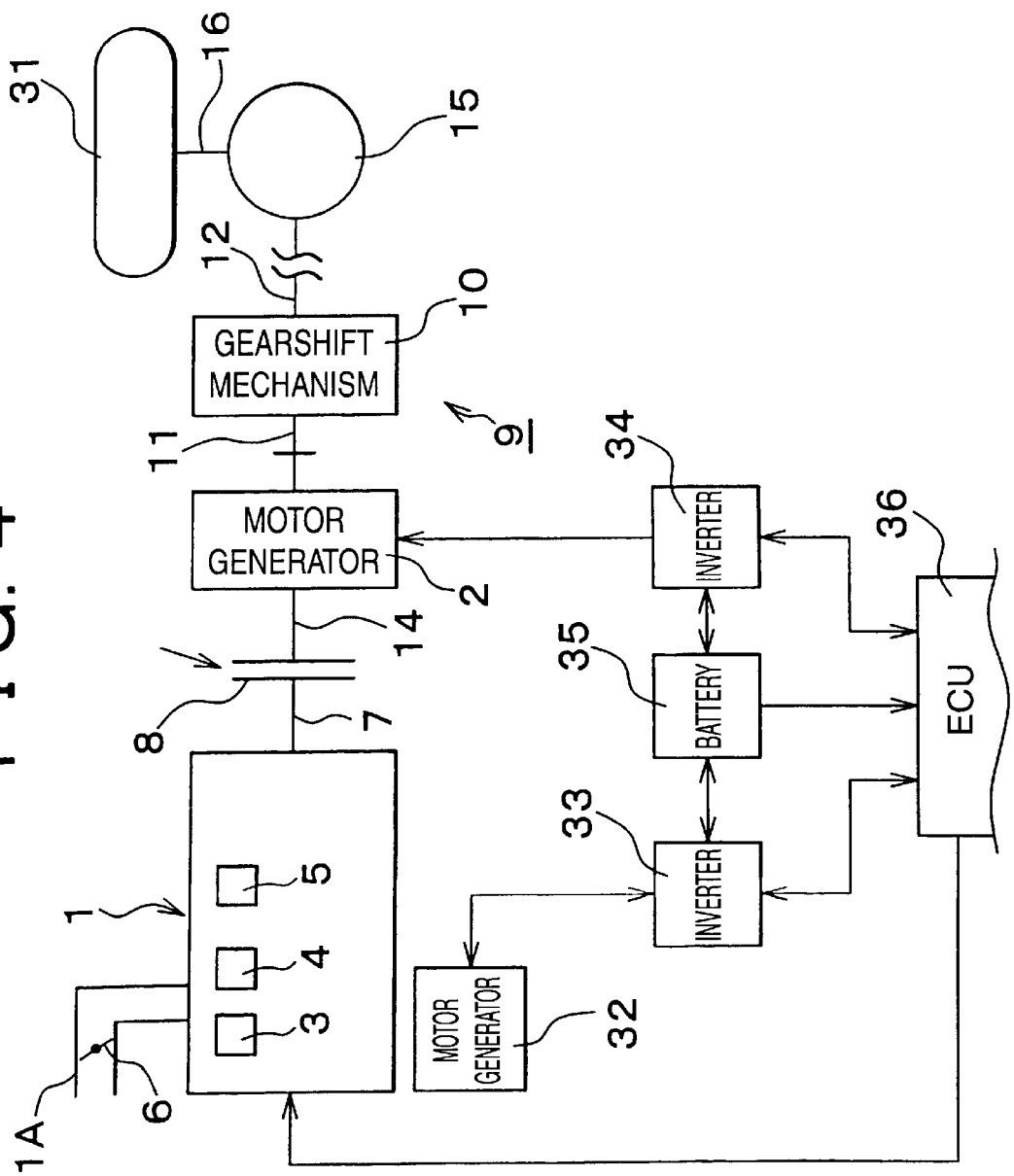
FIG. 4 is a diagram showing a second embodiment of a power train of the hybrid vehicle according to the invention.

The control of FIG. 1 can also be applied to a power train of FIG. 4. In FIG. 4, the transmission 9 is disposed in the power transmission path between the motor generator 2 and the differential 15. In other words, the power transmission shaft 14 is coupled to the rotor of the motor generator 2, and the clutch 8 is interposed between the power transmission shaft 14 and the crankshaft 7. The power transmission shaft 14 is coupled to the input member 11 of the transmission 9. The output member 12 of the transmission 9 is coupled to the differential 15. Since the structure of FIG. 4 is otherwise the same as that of FIG. 2, description thereof will be omitted. The power train of FIG. 4 transmits the torque of at least either the engine 1 or the motor generator 2 to the wheel 31 via the transmission 9.

The control of FIG. 1 applied to the power train of FIG. 4 will now be described. If the routine proceeds to step S2 via step S1, gearshift control of the transmission 9 is conducted in addition to the aforementioned MG running control, based on the aforementioned second control pattern. The second control pattern has a characteristic of controlling the gear ratio of the transmission 9 so that such a revolution speed is achieved in the motor generator 2 that the torque corresponding to the required driving power can be obtained.

In step S2, gearshift control of the transmission 9 may also be conducted in addition to the MG running control, based on a third control pattern giving priority to the power performance. The third control pattern is different from the second control pattern: the gear ratio of the transmission 9 selected according to the third control pattern is higher than that selected according to the second control pattern. When a step transmission is used as the transmission 9, the aforementioned gearshift control characteristic is achieved by, for example, setting the upshift line of the third control pattern on the higher vehicle speed side than that of the upshift line of the second control pattern. The use of a different control pattern to control the gear ratio of the transmission 9 means that the gear ratio selected in the transmission 9 is different even if the running state of the vehicle, for example, parameters such as accelerator opening and vehicle speed, is the same.

Thus, selecting the third control pattern enables the driver to quickly drive the vehicle to the intended location to be cleared even in the event of an emergency occurs where a failure in the clutch 8 causes disengagement at, for example, a location busy (congested) with transport like in an urban area. Thus, drivability is improved.

When the control process of FIG. 1 is applied to the power train of FIG. 4, a fourth control pattern giving priority to the efficiency of the motor generator 2 may be selected in step S2 in addition to the MG running control. The fourth control pattern has a characteristic of controlling the gear ratio of the transmission 9 so as to make the efficiency of the motor generator 2, i.e., the ratio of the output of the motor generator 2 in relation to the electric power supplied to the motor generator 2, as high as possible. Thus, selecting the fourth control pattern reduces the internal loss of the motor generator 2, preventing power consumption of the battery 35. Accordingly, the running distance of the vehicle to be cleared with the motor generator 2 as a driving power source is further increased.

When the control process of FIG. 1 is applied to the power train of FIG. 4, another control process by the driver's operation of the shift logic selector 18 may be available in step S2 in addition to the MG running control, so as to arbitrarily select a shift logic, i.e., either the third or fourth control pattern. Such a control allows the driver to determine the conditions around the vehicle and thus to select a suitable control pattern according to the determination result. Thus, drivability is further improved.

The control processes of FIGS. 1 and 3 can be used when the vehicle runs with at least either the power of the engine 1 or the power of the motor generator 2. In the case where the control process of FIG. 1 is conducted when the vehicle runs with only the power of the engine 1 as the driving power source and the routine proceeds from step S1 to step S2, the driving power source of the vehicle is switched from the engine 1 to the motor generator 2. In the case where the control process of FIG. 1 is conducted when the vehicle runs with only the motor generator 2 as the driving power source and the routine proceeds from step S1 to step S2 before starting of the engine 1, the running state of the vehicle is kept so that the vehicle runs with only the motor generator 2 as the driving power source. In the case where the control process of FIG. 1 is conducted when the vehicle runs with both the engine 1 and the motor generator 2 as driving power sources and the routine proceeds from step S1 to step S2, the running state of the vehicle is switched so that the vehicle runs with only the motor generator 2 as the driving power source.

On the other hand, in the case where the control process of FIG. 3 is conducted when the vehicle runs with only the power of the engine 1 as the driving power source and the routine proceeds from step S11 to step S12, the driving power source of the vehicle is switched from the engine 1 to the motor generator 2. In the case where the control process of FIG. 3 is conducted when the vehicle runs with only the motor generator 2 as the driving power source and the routine proceeds from step S11 to step S12 before starting of the engine 1, the running state of the vehicle is maintained so that the vehicle runs with only the motor generator 2 as the driving power source. In the case where the control process of FIG. 3 is conducted when the vehicle runs with both the engine 1 and the motor generator 2 as driving power sources and the routine proceeds from step S11 to step S12, the running state of the vehicle is switched so that the vehicle runs with only the motor generator 2 as the driving power source.

Figure 5:
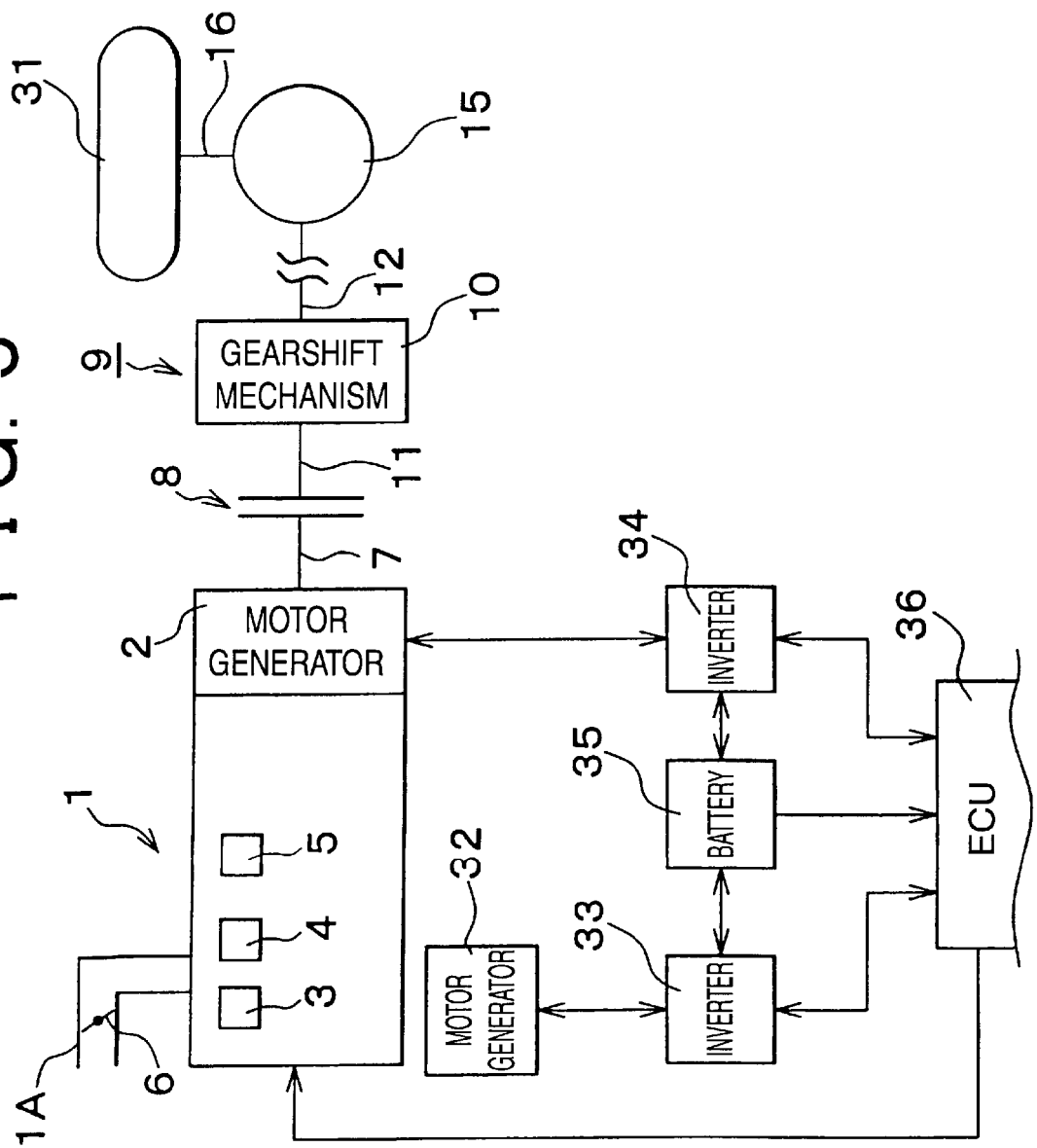
FIG. 5 is a diagram showing a third embodiment of a power train of the hybrid vehicle according to the invention.

FIG. 5 is a conceptual diagram showing the structure of another embodiment of a power train. In FIG. 5, the crankshaft 7 is coupled to the rotor of the motor generator 2. In other words, the clutch 8 is disposed in the power transmission path between the motor generator 2 and the transmission 9. Since the structure and control system of FIG. 5 are otherwise the same as those of FIG. 2, description thereof will be omitted. In the power train of FIG. 5, when the clutch 8 is engaged, the power of at least either the engine 1 or the motor generator 2 is transmitted to the wheel 31 through the transmission 9. In contrast, when the clutch 8 is disengaged, the power of the engine 1 and the motor generator 2 is not transmitted to the wheel 31.

Figure 6:
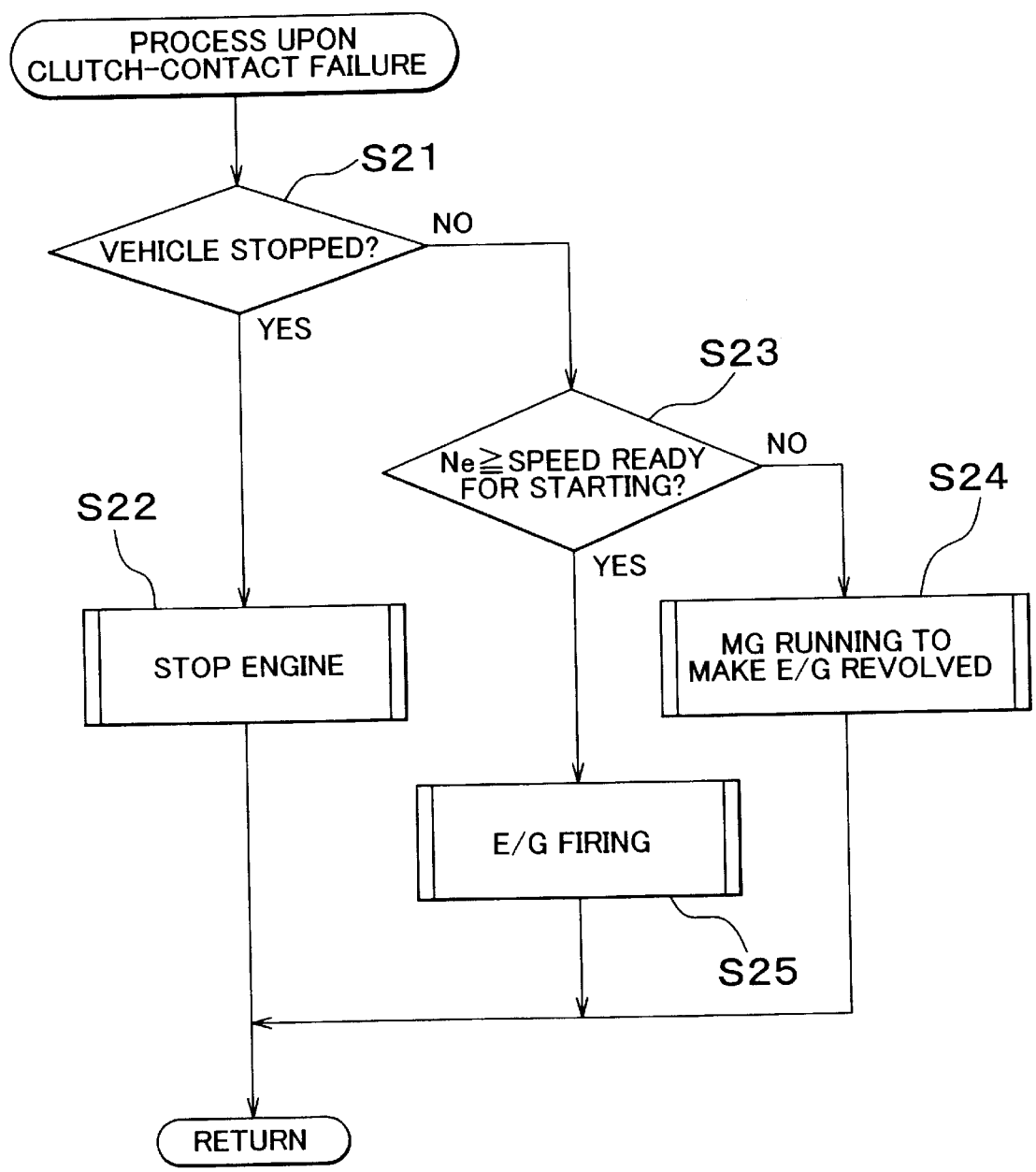
FIG. 6 is a flowchart illustrating a third embodiment of a control process according to the invention.

A control process that is applicable to the power trains of FIGS. 2, 4 and 5 is shown in FIG. 6. The control process of FIG. 6 is a routine conducted in response to a failure in which the clutch 8 is engaged all the time. First, it is determined whether or not the vehicle is stopped (step S21). The determination at step S21 is made based on the signals of the foot brake switch 23 and the output revolution speed sensor 27. If YES in step S21, i.e., if the motor generator 2 is stopped, the engine 1 is kept stopped (step S22), and the routine returns to start.

If NO in step S21, for example, if an accelerator pedal is depressed and the vehicle is running with the motor generator 2 as the driving power source, the engine 1 is made revolved by the power of the motor generator 2. This condition will now be described for each power train of FIGS. 2, 4 and 5. In the power train of FIG. 2, the power of the motor generator 2 is transmitted to the engine 1 via the transmission 9 and the clutch 8. In the power train of FIG. 4, the power of the motor generator 2 is transmitted to the engine 1 via the clutch 8. In the power train of FIG. 5, the power of the motor generator 2 is transmitted from the crankshaft 7 to the engine 1.

Then, it is determined whether or not an engine speed Ne is above a prescribed value (step S23). The prescribed engine speed means an engine speed that enables the engine 1 to revolve autonomously by the fuel injection control or the ignition control. If NO in step S23, the control of making the engine 1 revolved by the power of the motor generator 2 is continued (step S24), and then the routine returns to start. In step S24, neither fuel injection control nor ignition control is conducted, and the engine 1 is idling.

If YES in step S23, i.e., if the vehicle is running with the motor generator 2 as the driving power source, and vehicle speed increases and the engine speed reaches above a prescribed value, the fuel injection control and the ignition control (E/G firing control) and the intake air amount control are conducted (step S25), and then the routine returns to start. Thus, in the control process of FIG. 6, if a start request is generated when the vehicle is stopped and a failure in which the clutch 8 is engaged all the time has occurred, the vehicle is first started using the motor generator 2 as the driving power source. When the engine speed then reaches above a prescribed value, the fuel injection control, the ignition control and the intake air amount control are conducted. Accordingly, the engine 1 can be prevented from being started with the clutch 1 engaged during stopping of the vehicle. As a result, takeoff performance of the vehicle is improved.

Figure 7:
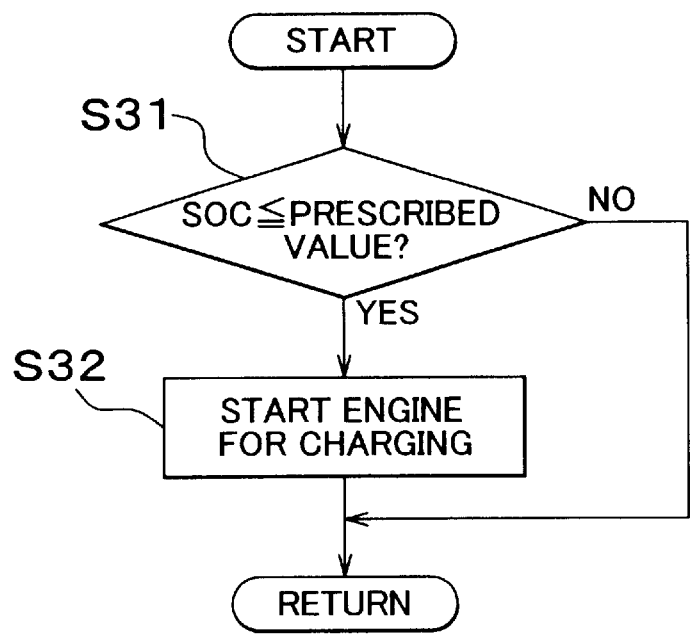
FIG. 7 is a flowchart illustrating a fourth embodiment of a control process according to the invention.

A sub-routine conducted in step S22 of FIG. 6 during stopping of the engine 1 will now be described in connection with FIG. 7. The control process of FIG. 7 is applicable to all power trains of FIGS. 2, 4 and 5. First, it is determined whether or not the SOC of the battery 35 has been reduced to below a prescribed value (step S31). If YES in step S31, the aforementioned neutral control is conducted, and the engine 1 is initially revolved with the power of the motor generator 32. Moreover, the fuel injection control and the ignition control are conducted for autonomous revolution of the engine 1. Thereafter, by using the power of the engine 1, the motor generator 32 is functioned as the generator so as to charge the battery 35 with the electric power of the motor generator 32 (step S32). If NO in step S31, the routine returns to start directly.

The control process of FIG. 7 can prevent reduction in the SOC of the battery 35. Accordingly, if the vehicle runs with the motor generator 2 as the driving power source in response to the vehicle start request after the control of FIG. 7, the running distance of the vehicle is increased due to the increased SOC of the battery 35. If the control process of FIG. 7 is conducted in each power train of FIGS. 2, 4 and 5 in response to a failure in which the clutch 8 is engaged all the time, the power of the engine 1 is not transmitted to the wheel 31. This is because the transmission 9 is in the neutral state even if the engine 1 is started in step S32.

Then, a control process conducted during autonomous revolution of the engine 1 after step S25 of FIG. 6 will now be described in connection with the flowchart of FIG. 8. In order to change the gear ratio of the transmission 9, the input revolution speed of the transmission 9 is forcibly synchronized with the input revolution speed after gearshift (so-called equal speed gearing) (step S41), and the routine returns to start. The input revolution speed after gearshift can be calculated based on, for example, the vehicle speed and the gear ratio after gearshift.

Figure 8:
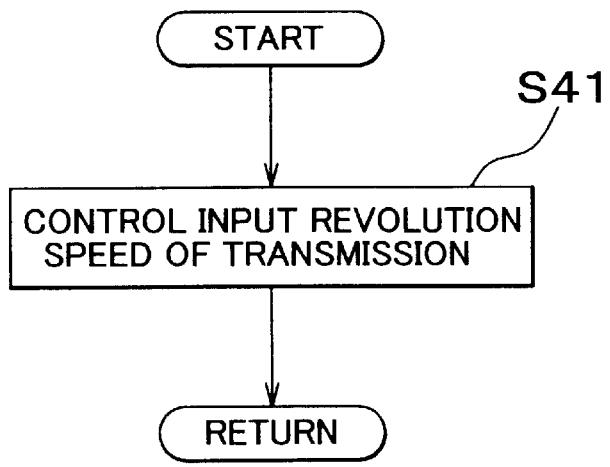
FIG. 8 is a flowchart illustrating a fifth embodiment of a control process according to the invention.

In the case where the control process of FIG. 8 is applied to the power train of FIGS. 4 or 5, the input revolution speed of the transmission 9 is controlled by controlling the revolution speed of the motor generator 2 in step S41. In the case where the control process of FIG. 8 is applied to the power train of FIG. 2, the engine speed is controlled by controlling a revolution speed controller, specifically, at least any one of the motor generator 32, igniter 3, fuel injection apparatus 4 and electronic throttle valve 6. As a result, the input revolution speed of the transmission 9 is controlled. Thus, the control process of FIG. 8 enables smooth and rapid gearshift control of the transmission 9 even when a failure in which the clutch 8 is engaged all the time has occurred.

Figure 9:
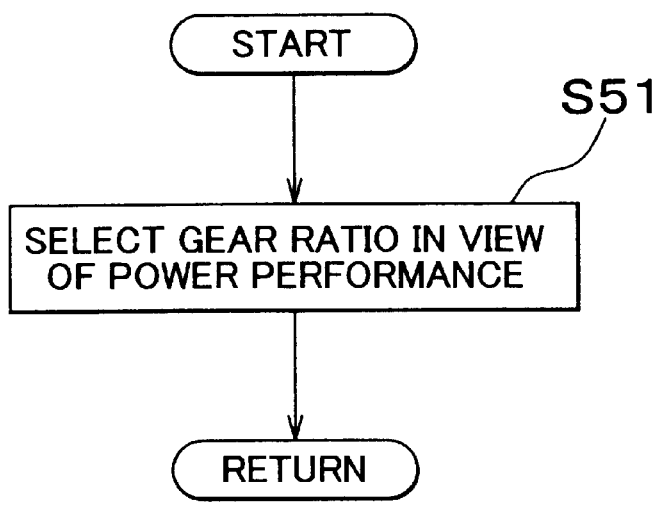
FIG. 9 is a flowchart illustrating a sixth embodiment of a control process according to the invention.

A control process conducted after step S22 of FIG. 6 in response to a request to start the engine 1 will now be described in connection with the flowchart of FIG. 9. The control process of FIG. 9 is applicable to each power train of FIGS. 2, 4 and 5. In order to make the starting performance of the engine 1 good, the engine speed must be quickly raised, with the power of the motor generator 2, to above a prescribed speed in which autonomous revolution is possible. In order to satisfy this requirement, it is desirable that the gear ratio of the transmission 9 is controlled to the lowest possible gear, i.e., the highest possible gear ratio.

In case a failure in the clutch 8 occurs causing continuous engagement, the clutch 8 cannot be disengaged to conduct gearshift of the transmission 9 even during the autonomous revolution of the engine 1. However, when such a failure has occurred, it is required that the running distance of the vehicle using the engine 1 as the driving power source be long. In order to satisfy this requirement, it is desirable that the gear ratio of the transmission 9 is controlled to the highest possible gear, i.e., the lowest possible gear ratio.

Therefore, with the engine 1 stopped in step S22 of FIG. 6, a gear ratio corresponding to the highest possible gear, i.e., the lowest possible gear ratio, is selected in advance as the gear ratio of the transmission 9, from the gear ratios capable of raising the engine speed above an autonomous revolution speed by using the power of the motor generator 2 (step S51), and then the routine returns to start. By conducting this control process, both requirements as described above can be satisfied. In step S51, the torque of the motor generator 2 is used to compensate for a deficiency of the engine torque with respect to the required driving power at a low vehicle speed, whereby the power performance of the vehicle can be ensured.

Figure 10:
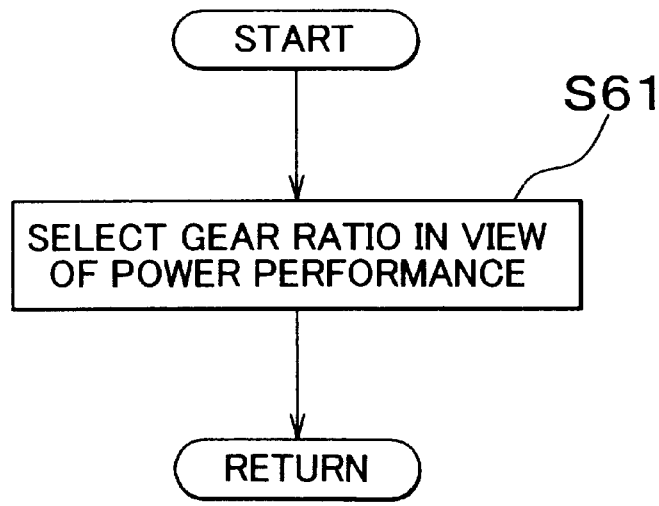
FIG. 10 is a flowchart illustrating a seventh embodiment of a control process according to the invention.

Another control process conducted after step S22 of FIG. 6 will now be described in connection with the flowchart of FIG. 10. The control process of FIG. 10 is applicable to each power train of FIGS. 2, 4 and 5. In the control process of FIG. 10, a gear ratio corresponding to a lower gear having excellent power performance is selected as the gear ratio of the transmission 9 during stopping of the engine 1 (step S61), and then the routine returns to start. For example, if a failure in the clutch 8 occurs causing continuous engagement at a congested location like in an urban area, the control process of FIG. 10 can improve the power performance of the vehicle after starting of the engine 1. Thus, the driver can drive the vehicle quickly to be cleared from the congested location.

The control processes of FIGS. 9 and 10 can be selectively switched according to the vehicle status. For example, if the vehicle is stopped with the engine also stopped, and a failure in the clutch 8 occurs causing continuous engagement, the control processes of FIGS. 9 and 10 can be selectively used based on the selected shift position at that time. More specifically, such a selective use is possible that the control process of FIG. 9 is conducted when the D position has been selected, and the control process of FIG. 10 is conducted when the L position has been selected. By selectively using the control processes based on the selected shift position, the gear to be selected upon takeoff of the vehicle can be controlled according to the shift operation of the driver. As a result, drivability is improved.

Figure 11:
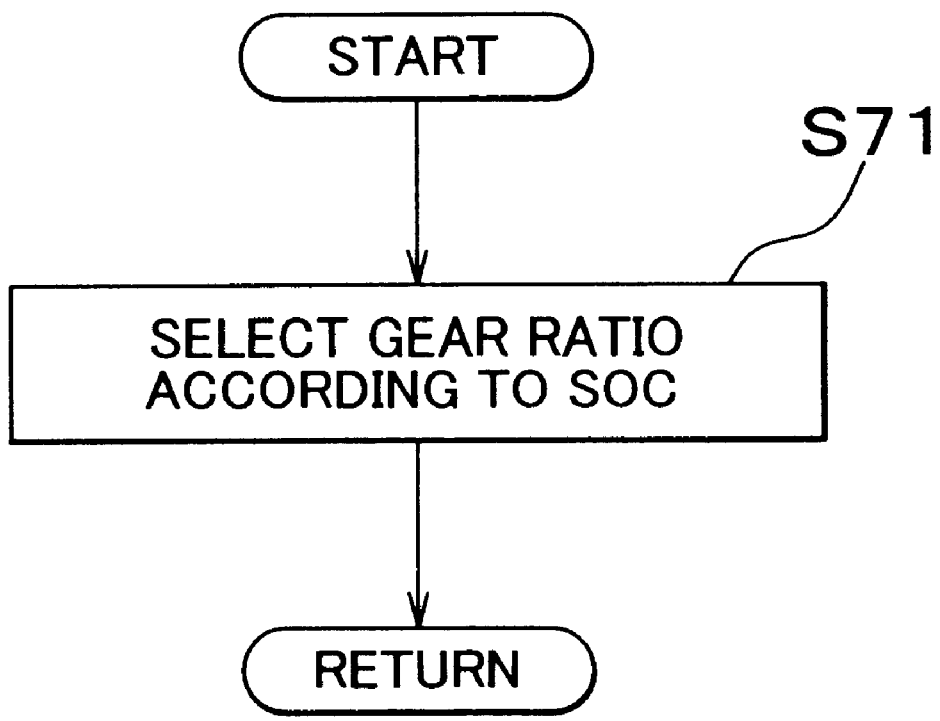
FIG. 11 is a flowchart illustrating an eighth embodiment of a control process according to the invention.

Still another example associated with step S22 of FIG. 6 will now be described in connection with the flowchart of FIG. 11. The control process of FIG. 11 is applicable to each power train of FIGS. 2, 4 and 5. In the control process of FIG. 11, the gear ratio of the transmission 9 is selected based on the SOC of the battery 35 (step S71), and then the routine returns to start. For example, when the SOC of the battery 35 is below a prescribed value, the first gear can be selected.

More specifically, in any one of the power trains of FIGS. 2, 4 and 5, provided that the engine 1 is initially revolved with the power of the motor generator 2 during stopping of the engine 1, the vehicle speed at which the engine speed reaches above a prescribed speed which allows the autonomous revolution is lower as the gear ratio of the transmission 9 is larger. In other words, a time from when the initial revolution of the engine 1 is started by the motor generator 2 until a time when the engine speed reaches a speed permitted above the autonomous revolution is shorter as the gear ratio of the transmission 9 is larger. Accordingly, when the SOC of the battery 35 is below a prescribed value, the first gear is selected as the gear ratio of the transmission, whereby reduction in the SOC of the motor generator 2 can be prevented. Thus, before the power supplied to the motor generator 2 is further reduced to such a degree that the vehicle can no longer run with the motor generator 2 as the driving power source, the running state of the vehicle can be switched from the state where the motor generator 2 is used as the driving power source to the state where the engine 1 is used as the driving power source.

In the case where the control process of FIG. 6 is conducted in response to a failure in the clutch 8 causing continuous engagement and the gear ratio of the transmission 9 cannot be switched, the following control process can be conducted: the maximum controllable vehicle speed is calculated based on that gear ratio and the upper limit of the engine speed, i.e., allowable engine speed, with the gear ratio being set, and the calculation result can be output from the failure state output apparatus 37. This control enables the driver to know, when the clutch 8 fails, the highest possible vehicle speed to be achieved at the currently set gear during the running to be cleared. Thus, it can be said that each of the examples of the control processes is a control process that ensures the running performance of the vehicle even if the power transmission apparatus fails, i.e., a fail-safe control.

A manual transmission capable of manually controlling the gear ratio by the driver's operation can be used as the transmission 9. Each of the aforementioned control processes can also be applied to a power train having a manual transmission. The first and second control patterns can also be referred to as normal control patterns respectively and the third and fourth control patterns can also be referred to as failure control patterns respectively.

The correspondence between the functional means shown in FIGS. 1, 3, 6 to 11 and the structure of the invention can be as follows: every step shown in FIGS. 1, 3, 6 to 11 can correspond to a driving power controller of the invention. In each control process, the control pattern can be changed by the following method: various control patterns can be pre-stored in the ECU 36 and selectively used depending on whether or not there is a failure or condition of the failure; or a reference control pattern can be pre-stored in the ECU 36 and corrected according whether or not there is a failure or condition of the failure. Instead of the battery 35, a capacitor can be used as an apparatus for retaining the power supplied to the motor generators 2 and 32 and accumulating the power generated by the motor generators 2 and 32.

In the illustrated embodiments, the controller is implemented with a general purpose processor. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to what are preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A control apparatus of a power train, comprising:
   first and second driving power sources that transmit power to a wheel;
   a power transmission apparatus that transmits the power of the first driving power source to the wheel; and
   a driving power controller that controls the power transmitted to the wheel through the second driving power source when the power transmission apparatus cannot transmit power of the first driving power source to the wheel.

2. The control apparatus according to claim 1, wherein:
the driving power controller controls the transmission of the power of the second driving power source to the wheel while preventing a load on the second driving power source during operations other than transmission of the power to the wheel.

3. The control apparatus according to claim 2, wherein:
the power train is structured so that the power of the first driving power source is transmitted to the wheel via a transmission, and an output side of the transmission is coupled to the second driving power source; and
the driving power controller reduces the load on the second driving power source by controlling the transmission to a neutral state.

4. The control apparatus according to claim 1, wherein:
the power train is structured so that the power of the second driving power source is transmitted to the wheel via a transmission; and
the driving power controller controls different gearshift controls of the transmission when the power transmission apparatus fails as compared to when the power transmission apparatus operates normally.

5. The control apparatus according to claim 4, wherein:
the driving power controller controls a gear ratio of the transmission to be higher when the power transmission apparatus fails than a ratio used when the power transmission apparatus operates normally.

6. The control apparatus according to claim 4, wherein:
the driving power controller improves an efficiency of the second driving power source when the gear ratio of the transmission is controlled when the power transmission apparatus has failed to be higher than an efficiency of the second driving power source when the gear ratio of the transmission is controlled with the power transmission apparatus operating normally.

7. The control apparatus according to claim 1, wherein:
the second driving power source is driven with electric power, and is provided with a generator driven by the first driving power source for supplying the generated electric power to the second driving power source; and
the driving power controller controls electric power generated by the generator with the power of the first driving power source when the power transmission apparatus fails.

8. The control apparatus according to claim 7, wherein:
the driving power controller controls electric power generated by the generator with the power of the first driving power source when the electric power supplied to the second driving power source is reduced below a prescribed value.

9. The control apparatus according to claim 1, wherein:
the power train is structured so that the power of the first driving power source is transmitted to the wheel via the transmission; and
the driving power controller to synchronizes an input revolution speed of the transmission with an input revolution speed after gearshift when the power transmission apparatus fails thereby controlling the power transmitted to the wheel through the second driving power source.

10. The control apparatus according to claim 1, further comprising:
an autonomous revolution controller for causing autonomous revolution of the first driving power source, wherein the driving power controller transmits the power of the second driving power source to the wheel causing an initial revolution of the first driving power source with the power of the second driving power source, and shifting revolution of the first driving power source from the initial revolution to autonomous revolution by the autonomous revolution controller.

11. A method for controlling a power train including first and second driving power sources for transmitting power to a wheel, and a power transmission apparatus for transmitting the power of the first driving power source to the wheel, comprising:
the step of controlling the power transmitted to the wheel through the second driving power source when the power transmission apparatus cannot transmit power of the first driving power source to the wheel.

12. The method according to claim 11, wherein:
a load on the second driving power source during operations other than transmission of the power to the wheel is prevented.

13. The method according to claim 12, wherein:
the power train is structured so that the power of the first driving power source is transmitted to the wheel via the transmission and an output side of the transmission is coupled to the second driving power source; and
the load on the second driving source is reduced by controlling the transmission in a neutral state.

14. The method according to claim 11, wherein
the power train is structured so that the power of the second driving power source is transmitted to the wheel via the transmission; and
gearshift controls of the transmission are controlled differently when the power transmission apparatus fails compared to when the power transmission apparatus operates normally.

15. The method according to claim 14, wherein:
a gear ratio of the transmission is controlled to be higher when the power transmission apparatus fails than a gear ratio of the transmission when the power transmission apparatus operates normally.

16. The method according to claim 14, wherein:
an efficiency of the second driving power source is improved by controlling the gear ratio of the transmission when the power transmission apparatus fails compared to an efficiency of the second driving power source that exists when the gear ratio of the transmission is controlled with the power transmission apparatus operating normally.

17. The method according to claim 11, wherein
the second driving power source is driven with electric power from a generator driven by the first driving power source that supplies the generated electric power to the second driving power source; and
electric power is generated by the generator with the power of the first driving power source when the power transmission apparatus fails.

18. The method according to claim 17, wherein:
electric power is generated by the generator with the power of the first driving power source when the electric power supplied to the second driving power source is reduced below a predetermined value.

19. The method according to claim 11, wherein:
the power train is configured so that the power of the first driving power source is transmitted to the wheel via a transmission; and
an input revolution speed of the transmission is synchronized with an input revolution speed after gearshift when the power transmission apparatus fails thereby controlling the power transmitted to the wheel through the second driving power source.

20. The method according to claim 11, wherein:

an autonomous revolution controller controls an autonomous revolution of the first driving power source; and an initial revolution of the first driving power source is driven by the power of the second driving power source, and revolution of the first driving power source is shifted from the initial revolution to autonomous revolution by the autonomous revolution controller.

* * * * *